United States Patent

Levrai

[11] Patent Number: 6,109,163
[45] Date of Patent: Aug. 29, 2000

[54] PNEUMATIC SERVOMOTOR WITH DYNAMICALLY VARIABLE MECHANICAL REACTION

[75] Inventor: Roland Levrai, Stains, France

[73] Assignee: Bosch Systemes de Fréinage, Drancy, France

[21] Appl. No.: 09/254,063

[22] PCT Filed: Feb. 8, 1999

[86] PCT No.: PCT/FR99/00266

§ 371 Date: Feb. 26, 1999

§ 102(e) Date: Feb. 26, 1999

[87] PCT Pub. No.: WO99/41124

PCT Pub. Date: Aug. 19, 1999

[30] Foreign Application Priority Data

Dec. 2, 1998 [FR] France .................................. 98 01665

[51] Int. Cl.[7] .................................................. F15B 9/02
[52] U.S. Cl. ................................................ 91/369.1
[58] Field of Search ............................ 91/369.1; 60/552

[56] References Cited

U.S. PATENT DOCUMENTS 3,470,697 10/1969 Pech et al. .......................... 91/369.1

FOREIGN PATENT DOCUMENTS 57-51558  3/1982  Japan .
1177686  1/1970  United Kingdom .

*Primary Examiner*—F. Daniel Lopez
*Attorney, Agent, or Firm*—Leo H McCormick, Jr; Warren Comstock

[57] ABSTRACT

The invention relates to a pneumatic booster using, by way of reaction members, a number of balls (15) trapped between three bearing faces (12, 13, 14), the first bearing face (12) consisting of a projecting and at least partially conical surface of the booster plunger (9). According to the invention, the first bearing face (12) has at least two different slopes (P1, P2) to allow a decrease in the reaction force in the event of quick actuation of the booster.

3 Claims, 5 Drawing Sheets

PNEUMATIC SERVOMOTOR WITH DYNAMICALLY VARIABLE MECHANICAL REACTION

The present invention relates to a pneumatic brake booster.

More specifically, the invention relates to a booster comprising: a rigid casing; a moving partition delimiting, in leaktight fashion, a front chamber and a rear chamber inside the casing, the front chamber in operation being connected to a first source of pressure delivering a first pressure; a pneumatic piston slidably mounted in an opening of the casing and moving with the moving partition; a three-way valve housed in the pneumatic piston and capable selectively of adopting a state of rest and an actuating state, in which states the rear chamber is respectively connected to the first source of pressure and to a second source of pressure which delivers a second pressure which, relative to the first pressure, has a difference capable of making a boost force acting in a first axial direction appear on the moving partition; a plunger housed in the pneumatic piston and able to move between a first and a second extreme position, for which positions the first valve is respectively in its state of rest and in its actuating state; an operating rod capable of receiving an input force acting in the first axial direction in order to move the plunger between its first and its second extreme positions; a push rod capable of transmitting at least part of the input and boost forces; and reaction means inserted between the plunger and the push rod for exerting on the plunger, against the action of the input force, a reaction which increases with the boost force, these reaction means comprising a first, a second and a third bearing face and a number of balls trapped between these three bearing faces, the first bearing face consisting of a projecting and at least partially conical surface of the plunger, the second bearing face consisting of a re-entrant and at least partially conical surface of the piston, and the third bearing face consisting of a surface which is at least partially perpendicular to the first axial direction of a plate secured to the push rod.

Devices of this type are known from the prior art, as illustrated, for example, by patents FR-1,515,403, U.S. Pat. No. 3,470,697, and FR-2,030,679.

Current research into improving braking in emergency situations has led to renewed interest in these devices in the public domain, that the invention sets out to improve with a view to allowing a decrease in the reaction force as a function of the rate of actuation of the brake.

To this end, the booster of the invention is essentially characterized in that the first bearing face has at least a first and a second slope, the second of which follows on from the first in a second axial direction which is the opposite of the first axial direction, and in that the first and second slopes make, with the second axial direction, a first and a second respective angle which are different and non-zero, the second of which is smaller than the first.

Thanks to these features, the reaction that the booster puts up against the input force actuating it adopts an intensity which depends on the rate of actuation of the brake.

The booster of the invention may further comprise an elastic washer, the axial bulk of which is all the smaller, the higher the crushing force to which it is subjected, this washer being inserted between the pneumatic piston and the push rod so as to form between the second and third bearing faces a space which decreases as the boost force increases.

Thanks to these features, the booster of the invention may have a response curve similar to that of current boosters, which use an elastomer disc by way of reaction member.

Other features and advantages of the invention will emerge clearly from the description thereof given hereafter by way of non-limiting indication with reference to the appended drawings in which.

Figure 1:
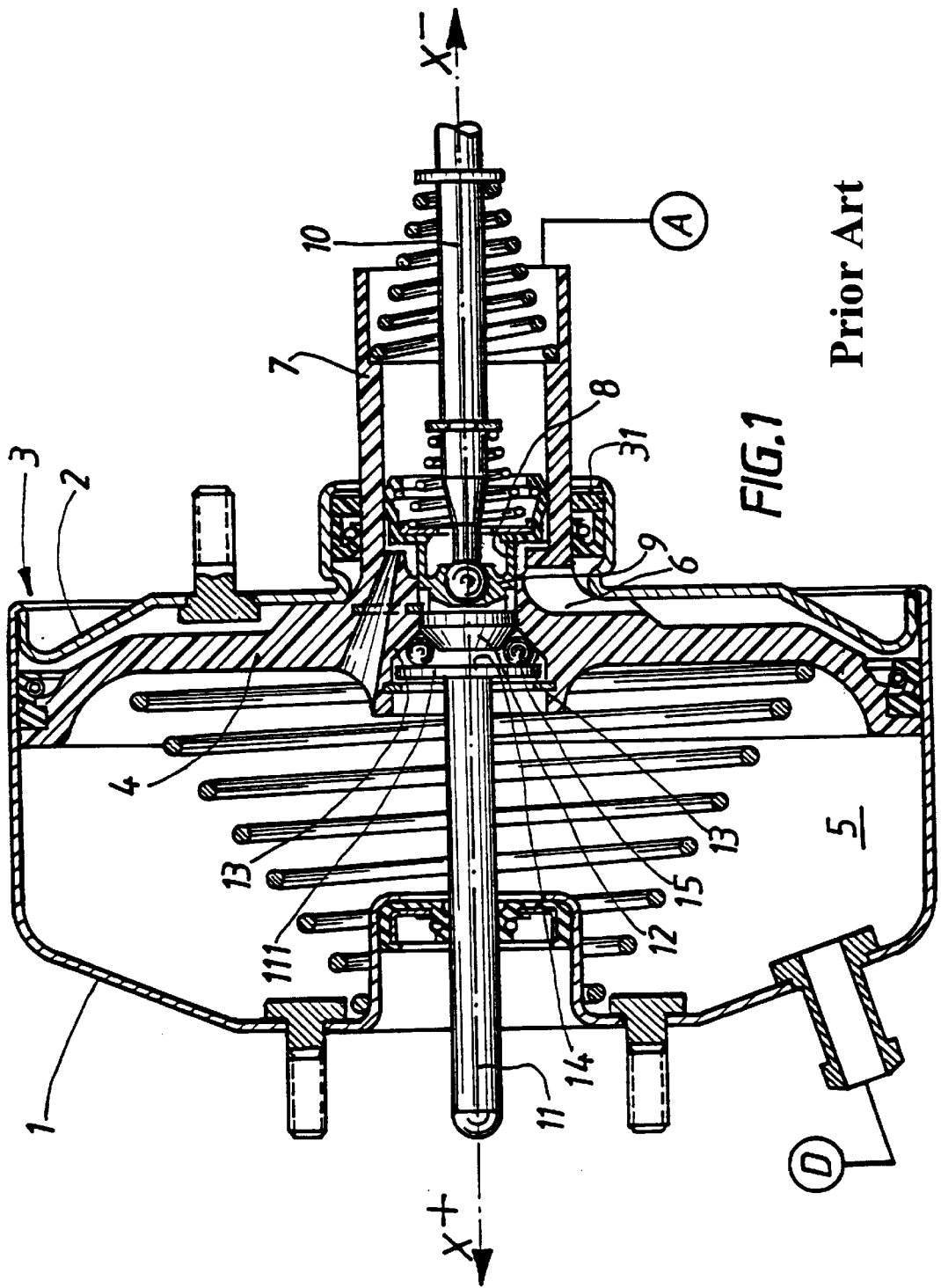
FIG. 1 is a sectional view of a known booster of the prior art (FR-1,515,403)
Figure 2:
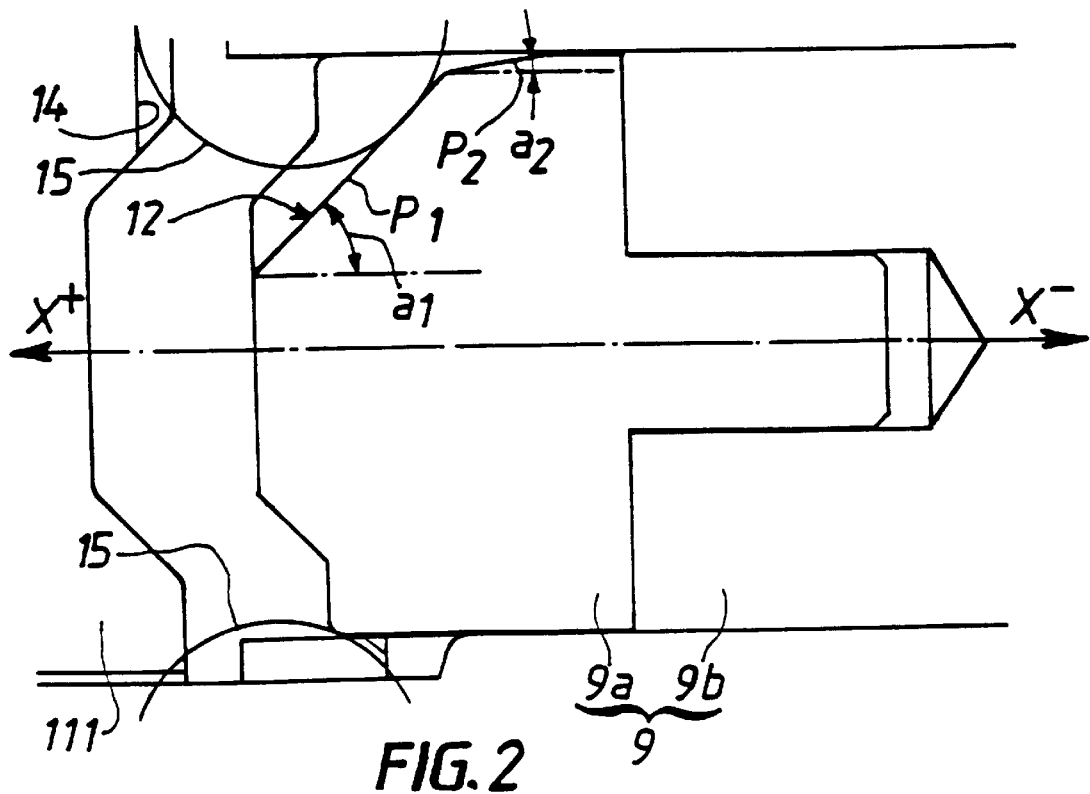
FIG. 2 is a sectional view of the front part of the plunger of a booster in accordance with the invention.

The pneumatic booster of the invention comprises, in a way known per se, a front shell 1 and a rear shell 2 which together form a rigid casing 3.

A moving partition 4 divides the inside of this rigid casing 3 in leaktight fashion and therein delimits a front chamber 5 and a rear chamber 6, the front chamber 5 in operation being connected to a first source of pressure D which delivers a first, relatively low, pressure Pd.

A pneumatic piston 7 slidably mounted in an opening 31 of the casing 3 moves with the moving partition 4 and carries a valve 8.

This valve is capable selectively of adopting a state of rest, which is the state depicted in FIG. 1, and an actuating state in which it opens to a second source of pressure A.

Thus, the rear chamber 6 is connected to the first source of pressure D when the valve 8 is in its state of rest, and is connected to the second source of pressure A when the valve 8 is in its actuating state.

Now, since the second source of pressure A is intended to deliver a second pressure Pa, for example atmospheric pressure, which is higher than the first pressure Pd, the moving partition 4 finds itself experiencing a boost force acting in an axial direction X+ as soon as the valve 8 is placed in its actuating state.

Figure 5:
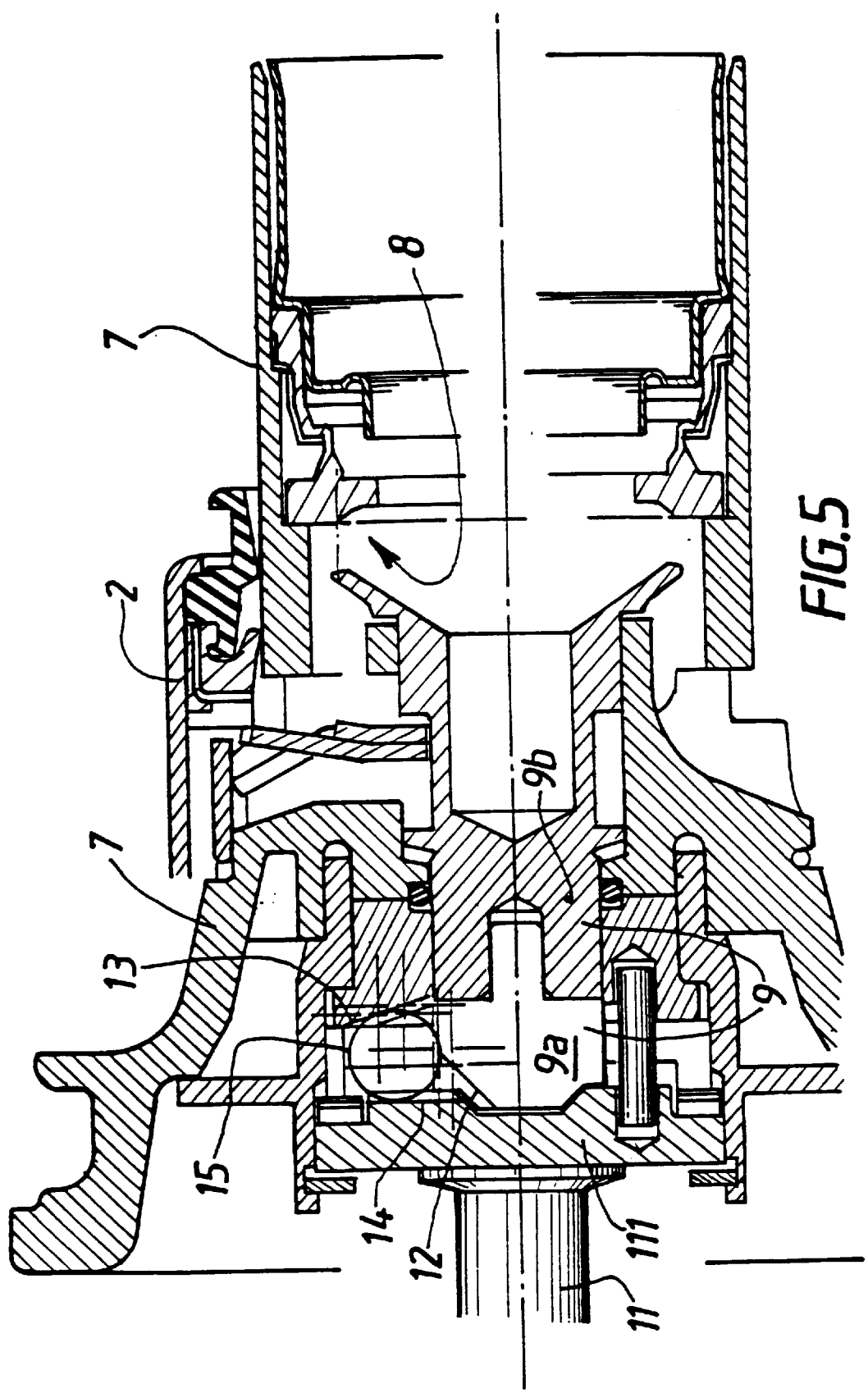
FIG. 5 is a view in part section of a booster in accordance with the invention, depicted in a transient state of quick actuation.

This valve 8 in fact comprises a plunger 9 housed in the pneumatic piston 7 and able to move between a first and a second extreme position, the first extreme position being the one in which the first valve 8 is in its state of rest (see FIG. 1), and the second extreme position being offset in the axial direction X+ relative to the first extreme position, and allowing the first valve 8 to be placed in its actuating state (see FIG. 5).

An operating rod 10 is provided for receiving an input force acting in the axial direction X+ and for moving the plunger 9 between its first and its second extreme positions.

A push rod 11, ending in a plate 111, is placed in line with the operating rod 10 to receive, and to pass on to a master cylinder (not depicted), an output force which is also oriented in the axial direction X+ and is made up of part of the input force and of the boost force.

As FIG. 1 shows, known boosters also comprise so-called "reaction" means inserted between the plunger 9 and the push rod 11, for exerting on the plunger, against the action of the input force, a reaction which increases with the boost force.

In boosters of the type in question, these reaction means more precisely comprise three bearing faces 12, 13, 14 and a number of balls 15 trapped between these bearing faces.

The first bearing face 12 consists of a projecting surface of the plunger 9, which surface is placed at the front part of this plunger and at least locally has an approximately conical shape.

The second bearing face 13 consists of a re-entrant surface of the piston 7, which surface is also placed at the front part of the piston, around the bearing face 12 of the plunger, and which also, at least locally, has an approximately conical shape.

Finally, the third bearing face 14 consists of the surface offered by the plate 111, and which is substantially perpendicular to the axial direction X+.

The way in which these reaction means work is as follows.

When an input force is applied to the operating rod 10, the plunger 9 moves closer to the push rod 11, separating the balls 15 from one another, which balls thus move away from the axis X—X+ of the booster and advance in the direction X+, climbing up the bearing face 13 of the piston 7.

At the same time, the movement of the plunger 9 causes the valve 8 to open and lets air at the relatively high pressure Pa into the rear chamber 6, this phenomenon causing the moving partition 4, and therefore also the piston 7, to move in the direction X+.

The movement of the piston 7 in turn causes a converging movement of the balls 15, which thus tend to climb back up the bearing face 12 of the plunger 9, therefore to push the latter back in the direction X−, the opposite direction to the direction X+.

When the movement of the push rod 11 in the direction X+ encounters appreciable resistance, the input force exerted on the plunger 9 via the operating rod 10, and the boost force exerted on the piston 7 by the differential pressure which the moving partition 4 experiences, therefore enter into competition to define the radial position of the balls 15, the input force experiencing from the boost force a reaction which it has to overcome in order to keep the valve 8 open.

The invention, which aims to improve these reaction means, makes provision, on the one hand, for the first bearing face 12 to have, for example, at least two slopes P1, P2 which make with the opposite axial direction X− respective angles a1, a2 which are different and non-zero, the second slope P2 being defined as being the one which follows on from the other in the opposite axial direction X−, and makes provision, on the other hand, for the second angle a2 to be smaller than the first angle a1.

The benefit and operation of these features are as follows.

When the booster is actuated by an input force which changes relatively slowly, which is the case for controlled braking for a planned checking of the speed of the vehicle, the reaction means act as mentioned earlier, the balls 15 bearing on the slope P1 of the bearing face 12 of the plunger 9, on the bearing face 13 of the piston, and on the bearing face 14 of the plate 111.

By contrast, when the booster is actuated by an input force which changes quickly, as is the case for emergency braking, the plunger takes an appreciable lead over the piston, which relates to the time it takes for the rear chamber 6 to fill.

Under these conditions, which are those depicted in FIG. 5, the balls 15 no longer encounter the bearing face 12 of the plunger 9 at its slope P1, but at its slope P2.

Now, since the angle a2 of this slope is smaller than the angle a1, the reaction exerted by the piston 7 on the plunger 9 via the balls 15 is reduced compared with the value it adopts in the case of normal braking.

Thus, not only can a greater proportion of the input force be used in emergency braking situations, but it is also possible to avoid the driver, used to metering the braking force he is applying as a function of the resistance he encounters, instinctively releasing his force in these situations.

Figure 4:
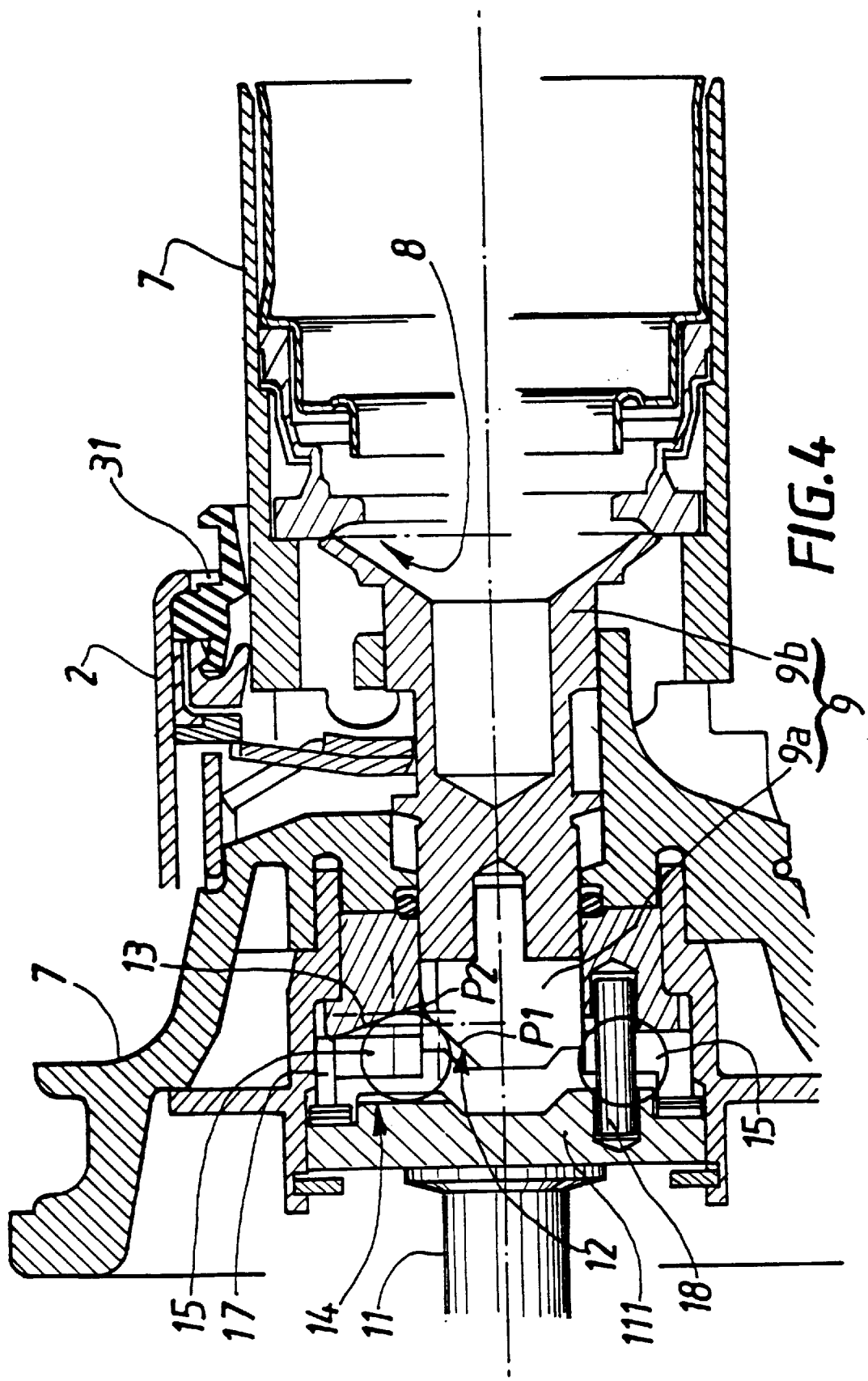
FIG. 4 is a view in part section of a booster in accordance with the invention, depicted in a position of equilibrium under load.
Figure 6:
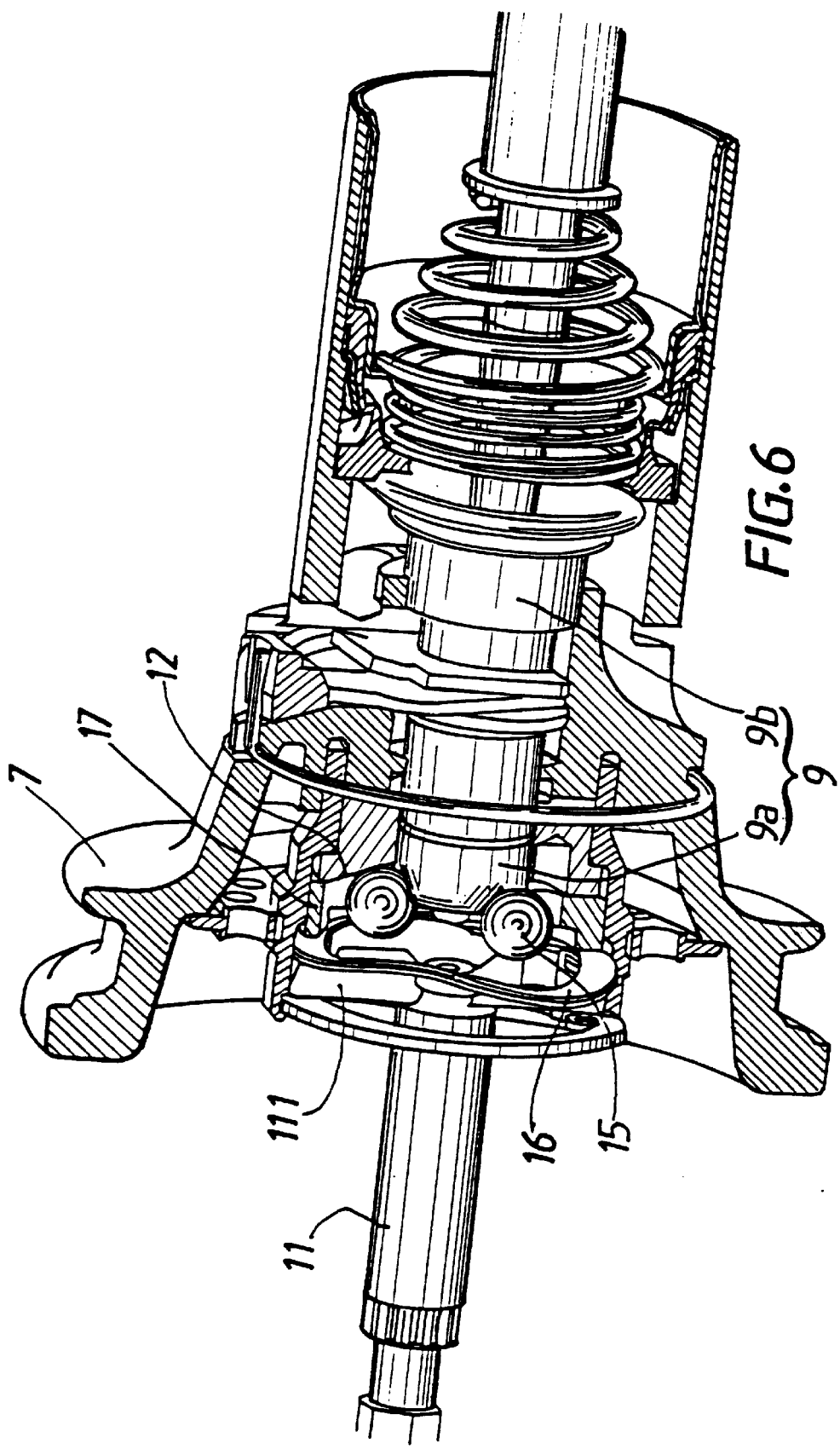
FIG. 6 is a partial perspective view of a booster in accordance with the invention.

As FIGS. 4 to 6 show, the booster of the invention also and preferably comprises an elastic crinkle washer 16 inserted between the pneumatic piston 7 and the push rod 11.

Thanks to its crinkles, this washer 16 has an axial bulk, that is to say an apparent thickness which is greater than the thickness of the material of which it is made.

Furthermore, this washer can be crushed elastically, that is to say that its axial bulk is all the smaller, the higher the crushing force to which it is subjected.

Under these conditions, the washer 16 forms, between the bearing face 13 of the piston 7 and the bearing face 14 of the push rod, a space which decreases when the boost force increases, so that the balls 15 are not trapped between the bearing faces 12, 13 and 14 except when the boost force is greater than the force being used to crush the washer 16, this arrangement making it possible to give, in the booster response curve, a jump which is characteristic of the operation of current boosters.

As FIGS. 4 and 6 show, the piston may bear against the washer 16 in only an indirect way, via a ring 17.

It may also be beneficial to make the plunger 9 in two parts, this plunger then comprising a front part 9a of high hardness, on which the bearing face 12 is defined, and a rear part 9b which need merely have a lower hardness.

Figure 3:
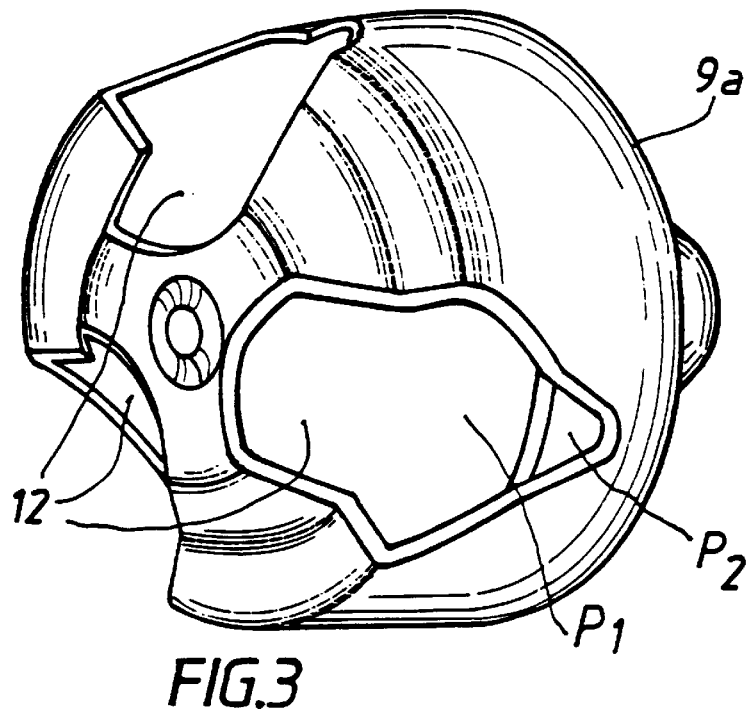
FIG. 3 is a perspective view of the front part of the plunger of a booster in accordance with the invention.

As FIG. 3 shows, the bearing face 12 may in fact be produced in the form of non-contiguous indentations, adopting both a conical overall arrangement and a cylindrical individual profile in order better to guide the balls 15, in this case three of them in the example illustrated.

Finally, a pin 18 may be provided (FIG. 4) between the piston 7 and the plate 111 in order to provide angular location of these two parts one with respect to the other and improve guidance thereof.

I claim:

1. A pneumatic brake booster comprising: a rigid casing; a moving partition within said rigid casing delimiting, in leaktight fashion, a front chamber and a rear chamber, said front chamber being connected to a first source of pressure having a first pressure; a pneumatic piston slidably mounted in an opening of said casing and moving with the moving partition; a three-way valve housed in said pneumatic piston and capable selectively of adopting a state of rest and an actuating state, in which states said rear chamber is respectively connected to said first source of pressure and to a second source of pressure which delivers a second pressure which, relative to said first pressure, has a difference capable of making a boost force, said boost force acting in a first axial direction on said moving partition; a plunger housed in said pneumatic piston and moved between first and a second extreme positions, said first valve is respectively in a state of rest and in an actuating state; an operating rod capable of receiving an input force acting in said first axial direction in order to move said plunger between said first and second extreme positions; a push rod capable of transmitting at least part of the input and boost forces; and reaction means inserted between said plunger and said push rod for exerting a reaction force on said plunger against the action of an input force, said reaction force which increases as a function of boost force, said reaction means comprising a first, a second and a third bearing faces with a number of balls trapped between said first, second and third bearing faces, said first bearing face consisting of a projecting and at least a partially conical surface on the plunger, said second bearing face consisting of a re-entrant and at least a partially conical surface on the piston, and said third bearing face consisting of a surface which is at least partially perpendicular to a first axial direction of a plate secured to the push rod, characterized in that said first bearing face has at least a first and a second slope, said second slope following on from said first slope in a second axial direction which is the opposite of said first axial direction, and in that said first and second slopes make, with said second axial direction, first and second respective angles which are different and non-zero, with said second slope being smaller than said first slope.

2. The booster according to claim 1, further characterized by an elastic washer inserted between said pneumatic piston and said push rod to form a space between said second and third bearing faces which decreases with an increase in boost force.

3. The booster according to claim 1, further characterized by an elastic washer located between said pneumatic piston and push rod having an axial bulk which decreases with an increase in said reaction force.

* * * * *